United States Patent [19]

Meyer et al.

[11] Patent Number: 5,251,711
[45] Date of Patent: Oct. 12, 1993

[54] LAWN MOWER

[75] Inventors: Robert B. Meyer, Middleburg Heights; John R. Lackner, Westlake; Hans J. Matuscheck, Parma; Daniel J. Kennedy, Cleveland, all of Ohio

[73] Assignee: The Scott Fetzer Company, Westlake, Ohio

[21] Appl. No.: 837,157

[22] Filed: Feb. 18, 1992

Related U.S. Application Data

[60] Continuation-in-part of Ser. No. 708,464, May 31, 1991, which is a division of Ser. No. 442,615, Nov. 29, 1989, abandoned.

[51] Int. Cl.$^5$ .............................................. B62D 51/04
[52] U.S. Cl. ................................... 180/19.1; 56/11.3; 180/19.3
[58] Field of Search ............... 180/19.1, 19.2, 19.3; 15/340.2, 340.3; 56/11.3, 11.7

[56] References Cited

U.S. PATENT DOCUMENTS

| | | | |
|---|---|---|---|
| 2,191,426 | 2/1940 | Clapper | 180/19.1 |
| 2,860,473 | 11/1958 | Wehner . | |
| 2,941,610 | 6/1960 | Clemson | 180/19.3 |
| 3,802,170 | 4/1974 | Siefert et al. . | |
| 4,212,141 | 7/1980 | Miyazawa et al. . | |
| 4,306,405 | 12/1981 | Fleigle . | |
| 4,538,401 | 9/1985 | Takamizawa et al. . | |
| 4,554,780 | 11/1985 | Umeno et al. . | |
| 4,689,939 | 9/1987 | Seyerle . | |
| 4,716,717 | 1/1988 | Ogano et al. . | |
| 4,856,264 | 8/1989 | Nishimura et al. . | |

Primary Examiner—Mitchell J. Hill
Attorney, Agent, or Firm—Watts, Hoffmann, Fisher & Heinke Co.

[57] ABSTRACT

A walk-behind, self-propelled lawn mower having a variable speed drive transmission responsive to operator applied forces. The drive transmission is mounted on a frame and comprises gearing operatively connected to an engine and a drive shaft for transmitting forces from the engine to the shaft. A clutching structure including a frictional coupling is coactable with an element of the gearing selectively to provide force transmission to the drive shaft. An actuator structure is controllably connected to the clutching structure and responsive to operator applied forces for controlling the speed at which the lawn mower traverses along a ground surface and to vary the speed proportionally to operator applied forces. The lawn mower also includes a handle pivotally connected to the frame and operatively connected to the actuator structure. The handle is adapted to pivot in response to the operator applied forces.

18 Claims, 9 Drawing Sheets

LAWN MOWER

This is a continuation-in-part of Ser. No. 07/708,464, filed May 31, 1991, entitled "Drive System," which is a division of Ser. No. 07/442,615, filed Nov. 29, 1989, entitled "Drive System" and now abandoned. Patent application Ser. No. 07/708,464, entitled "Drive System," is incorporated herein in its entirety by reference.

TECHNICAL FIELD

This invention relates to lawn mowers, and more specifically to self-propelled, walk-behind lawn mowers.

BACKGROUND

Self-propelled, walk-behind lawn mowers are typically limited to a speed which is proportional to the speed of an engine which drives the mower and also rotates the mower blade. A throttle controls the speed of the engine, and if it is desired to slow down the speed at which the mower travels, the engine must be slowed down by control of the throttle, thereby causing the blade to be rotated at a slower speed which may be inadequate for proper cutting.

With modern self-propelled lawn mowers, typically there is a control handle which projects upwardly and rearwardly from the body of the mower. While the angular relationship of the control handle relative to the body is frequently adjustable, once adjusted and in use, the angular relationship is fixed. The throttle control and a drive engagement lever are typically pivotally connected to the control handle at a location spaced toward the lawn mower from that portion of the control handle which is intended to be gripped by the operator for steering of the lawn mower. Thus, if either the throttle or the drive engagement lever is to be manipulated, the operator has but one hand to grip the steering portion making it difficult to disengage the drive or throttle down the mower when one wishes to manipulate the mower around trees, shrubs or other obstructions.

The manipulation of the mower is further complicated in that, in order to meet safety regulations, "dead man" blade controls are now provided. The dead man control is typically a member that is pivotally carried by the control handle and connected by a linkage to a blade engagement mechanism so that the blade is driven when, but only when, the blade control member is grasped by the operator concurrently with grasping of the control handle. Thus, it is necessary to keep at least one hand on the control handle and the blade control member as one maneuvers around the trees, shrubs or other obstructions.

Prior self-propelled, walk-behind lawn mowers can be difficult to control as their take-off is often jerky. In addition, this type of lawn mower tends to "race away" from the operator when going down a hill. When going up a hill, the lawn mower tends to "drag". Once again, in order to adjust the speed of the lawn mower, the operator must remove one hand from the gripping portion and adjust the throttle.

Suggestion has been made in vacuum cleaner prior art to using a drive transmission designed for a vacuum cleaner in a lawn mower. These vacuum cleaner transmissions have been intended to improve the performance of vacuum cleaners in which they are used but, prior to the cleaner of the patent application, have met with limited success. While the suggestion has been made, because of adaptability and other problems, no lawn mowers have been made commercially available using any of the prior art vacuum cleaner or similar drive transmissions.

SUMMARY OF THE INVENTION

In accordance with the present invention, a self-propelled, walk-behind lawn mower has a drive shaft with at least one of the mower wheels connected to an end portion of the drive shaft. A drive system is interposed between an engine and the drive shaft. The system selectively connects the engine to the shaft and transmits forces from the engine to the shaft. The system includes gearing and a clutch including a frictional coupling coactable with an element of the gearing selectively to provide drive forces to the drive shaft. An actuator is controllably connected to the clutch and is responsive to operator applied forces to control the speed of the lawn mower and vary the speed in proportion to operator applied forces.

The lawn mower, like prior mowers, has a control handle. A drive control lever, preferably constructed similar to the dead man blade control, is pivotally mounted on the handle and linkage connected to the actuator. The dead man control and the drive control can be concurrently gripped by both hands as the operator grasps the control handle to steer the mower. As the operator varies the pressure on the drive control, speed is controlled as a function of the force applied to the drive control and transmitted to the actuator by the linkage. Accordingly, the operator can control the speed of the mower while keeping two hands on the control handle for steering of the mower, which greatly facilitates the maneuvering of the mower around obstacles.

Since the coupling transmitted force is a function of operator pressure, the lawn mower is caused to move at a speed which is proportional to the forces applied by an operator. The harder the operator pushes the lawn mower, such as, due to an operator's natural instincts when pushing the mower up a hill or when trying to move the mower at a greater speed, the greater the force and power supplied by the drive system. Similarly, when going down a hill, the operator's natural instinct is to apply less force to the control lever so that the lawn mower does not go "racing" down the hill.

In the preferred embodiment, the mower control handle, like the handles of prior walk-behind mowers, while adjustable, is in a fixed angular relationship with the mower when in use. As a consequence, if the mower is traversing uneven terrain and, for example, a front wheel goes over a rock, the front of the mower will rise pivoting the mower about the axis of rear drive wheels. This pivoting action lowers the mower control handle and results in an unintended increase of pressure on the drive control. This unintended increased pressure on the drive control tends to cause the mower to speed up.

To overcome the problem of potential speed-up when the mower is traversing uneven terrain, the linkage between the drive control lever and the actuator includes a biased connection. The biased connection absorbs forces induced by the terrain such as when one wheel goes over a rock. The force absorption modulates the amount of force which is applied to the actuator to minimize undesired acceleration or deceleration induced by uneven terrain.

The materials of the clutch have been optimized to achieve excellent wear and operating "feel." "Feel" refers to the sense the operator has of controlling the lawn mower speed. The preferred clutch materials consist of cork fabric on a gear face and a chrome-plated disc. These materials substantially prevent the clutch from jerking or grabbing when the drive system is engaged and allow for smooth, reliable control.

Accordingly, it is an object of the present invention to provide a new and improved self-propelled, walk-behind lawn mower having a variable speed transmission which is responsive to operator applied forces applied by an operator maintains both hands on the steering control.

DETAILED DESCRIPTION OF THE PREFERRED EMBODIMENTS

Figure 1:
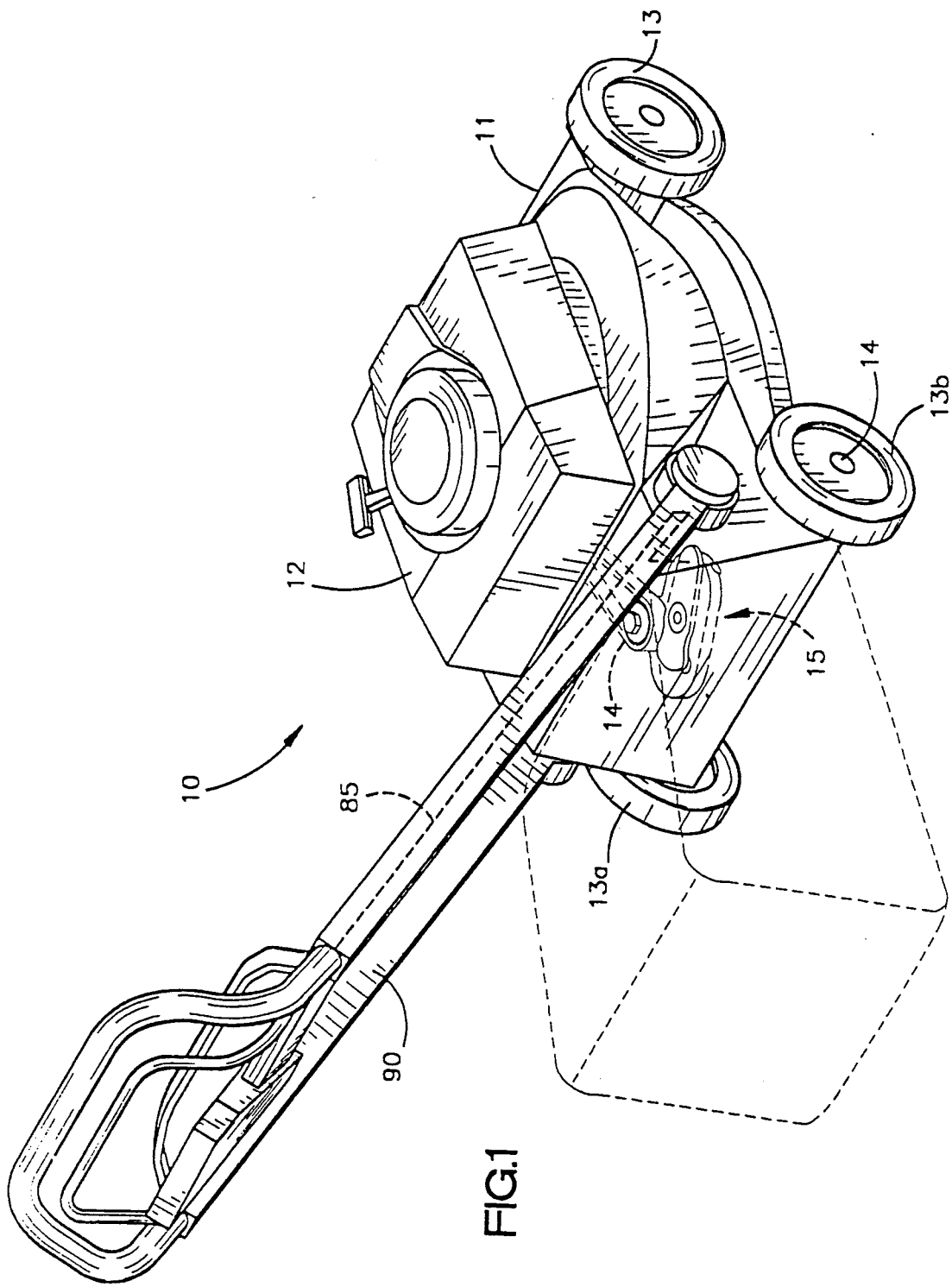
FIG. 1 is a perspective of a lawn mower.

Turning to the drawings, a lawn mower 10 is illustrated. The mower 10 has a housing and frame structure 11 which carries an engine 12 and is supported by wheels 13. Two of the wheels 13a, 13b are located at the rear of the lawn mower 10. The wheels 13a, 13b are drivingly connected to opposite ends of a drive shaft 14. A drive transmission 15 is operatively connected to the engine 12 and to the drive shaft 14.

Figure 5A:
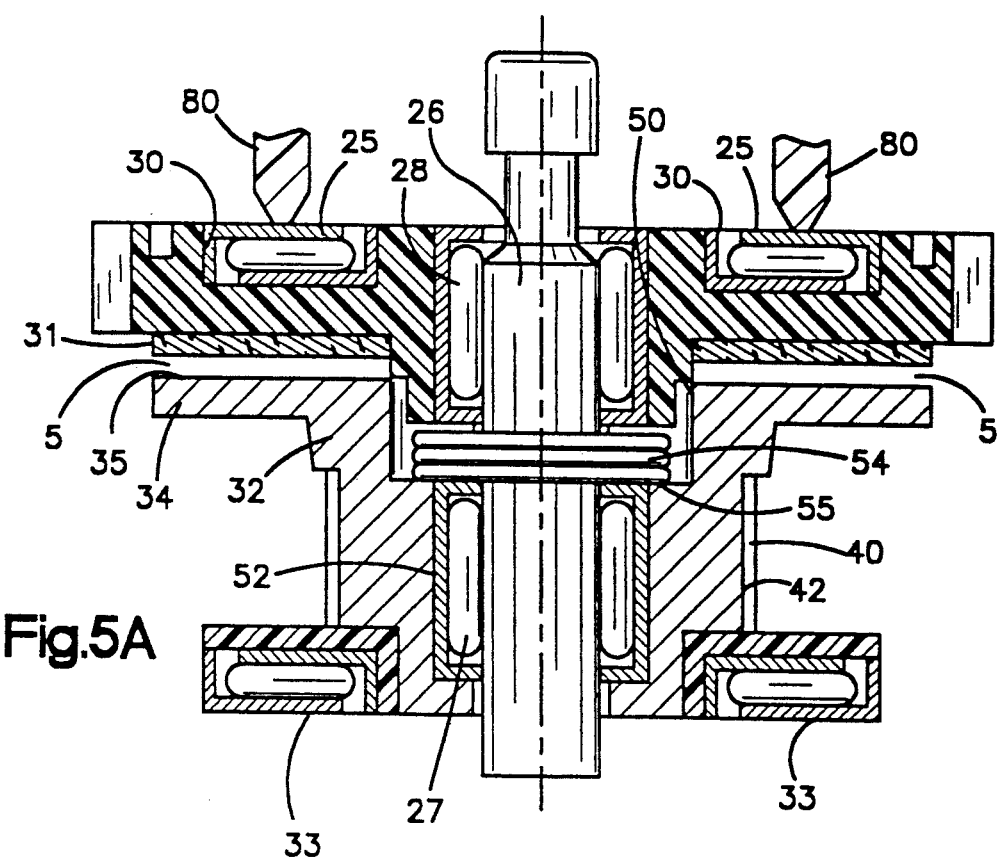
FIG. 5A is a cross-sectional view on an enlarged scale of a gear and clutch arrangement of the drive transmission as seen approximately from the plane indicated by the line 5A—5A of FIG. 3.
Figure 5B:
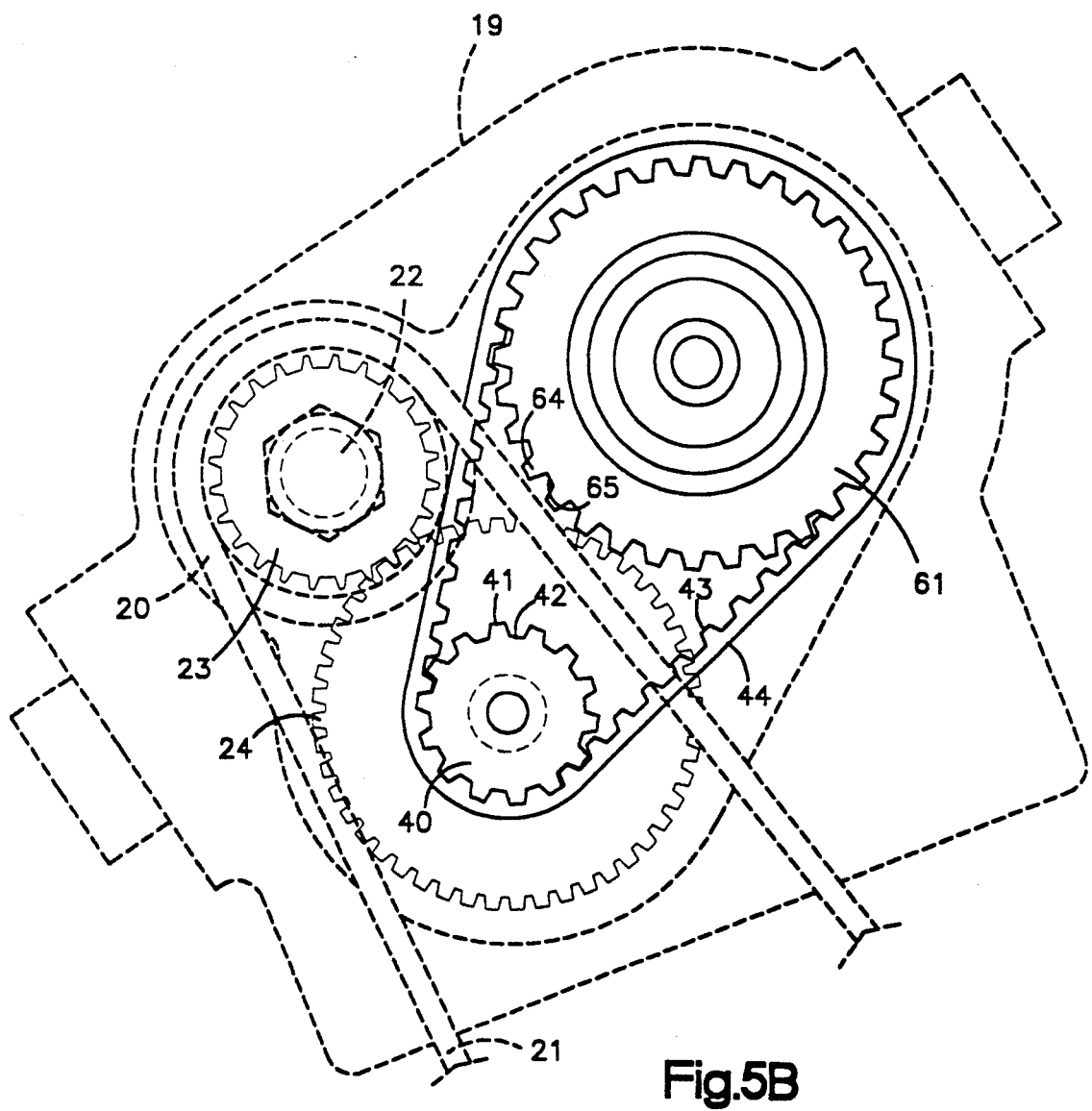
FIG. 5B is a plan view of the drive transmission with a top portion of a drive transmission casing removed.
Figure 6A:
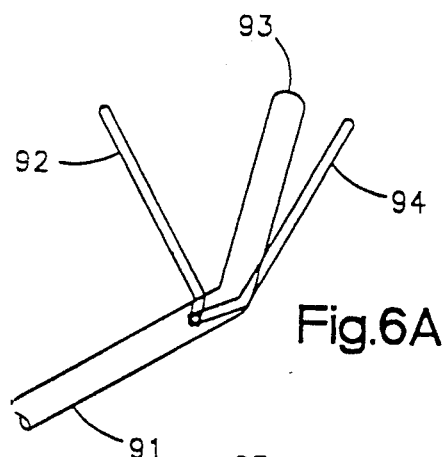
FIGS. 6A–6D are side elevational views of one embodiment of a handle for the lawn mower illustrating the levers in various stages of engagement.

As best shown in FIG. 5B, the drive transmission 15 is housed in a casing and bracket 19 and comprises an input gear or pulley 20 (shown in phantom) operatively connected to the engine 12 via a flexible belt 21 (shown in phantom). The input gear is mounted on an input shaft 22. The input shaft 22 has an input gear or pinion 23 (shown in light lines) located at an end opposite the input pulley 20. Washer 20a and nut 20b attach the pulley 20 to the shaft 22. Bearings 23a and 23b (shown in FIG. 8B) are located on opposite sides of the input gear 23. The input pinion is meshed with an intermediate gear 24 (shown in light lines) which is preferably made of acetal. Powdered metal or iron are also suitable materials. During operation of the engine 12, the input pulley 20, input pinion 23 and intermediate gear 24 constantly rotate. The gear 24 is journaled on a shaft 26 by a cylindrical anti-friction bearing assembly 28 (shown in FIGS. 5A and 8B).

As best seen in FIGS. 2, 3, 5A and 8B, a thrust bearing assembly 25 is adjacent the intermediate gear 24. The thrust bearing 25 is of an anti-friction type, generally commercially available. The bearing 25 has a plurality of radially oriented rollers between a pair of annular flat races. The rollers are circumferentially spaced about the shaft 26 of the gear 24. A flat annular pocket or recess 30 in a rear face of the gear 24 receives the associated thrust bearing assembly 25 with a press fit.

On a face of the gear 24 opposite the thrust bearing 25, is a circular portion 31 of friction facing material. Preferably, the friction facing material is a cork fabric having a coefficient of friction between 0.230 and 0.305. In a current prototype, the cork used is Dodge 258 HT having a coefficient of friction of 0.256 which is supplied by The Philpott Rubber Company, 2077 East 30th Street, Cleveland, Ohio 44115. Tests indicate this cork provides the best operator "feel" during use of the mower 10 and provides optimum wear of the friction facing material.

As best seen in FIGS. 2, 3, 5A and 8A, a transmission output element in the form of a clutch/sprocket member 32 is adjacent to the intermediate gear 24 and is disposed in confronting relation to the circular portion 31 of friction facing material to define a space S. The clutch/sprocket 32 is journaled on the shaft 26 by an anti-friction bearing 27. A thrust bearing 33, identical to thrust bearing 25, is provided. The thrust bearing 33 is interposed between clutch/sprocket member 32 and the casing 19. A washer/support 33a is interposed between the thrust bearing 33 and the clutch/sprocket member 32.

The clutch/sprocket member 32 includes a radially extending circular flange 34 having an annular clutching surface 35 lying in a radial plane which contacts the circular portion 31 of friction facing material when the transmission 15 is engaged. The flange 34 forms the major diameter of the clutch/sprocket member 32 while forming only a fraction of the axial length.

Preferably, the clutch/sprocket member 32 comprises No. 380 aluminum to provide heat dissipation. The clutch/sprocket member 32 is also chrome-plated with a layer of chrome between 0.0001 and 0.0003 inches. However, other materials are acceptable if such materials meet the correct coefficient of friction and wear requirements when considered in combination with the cork material of the circular portion 31.

Figure 8A:
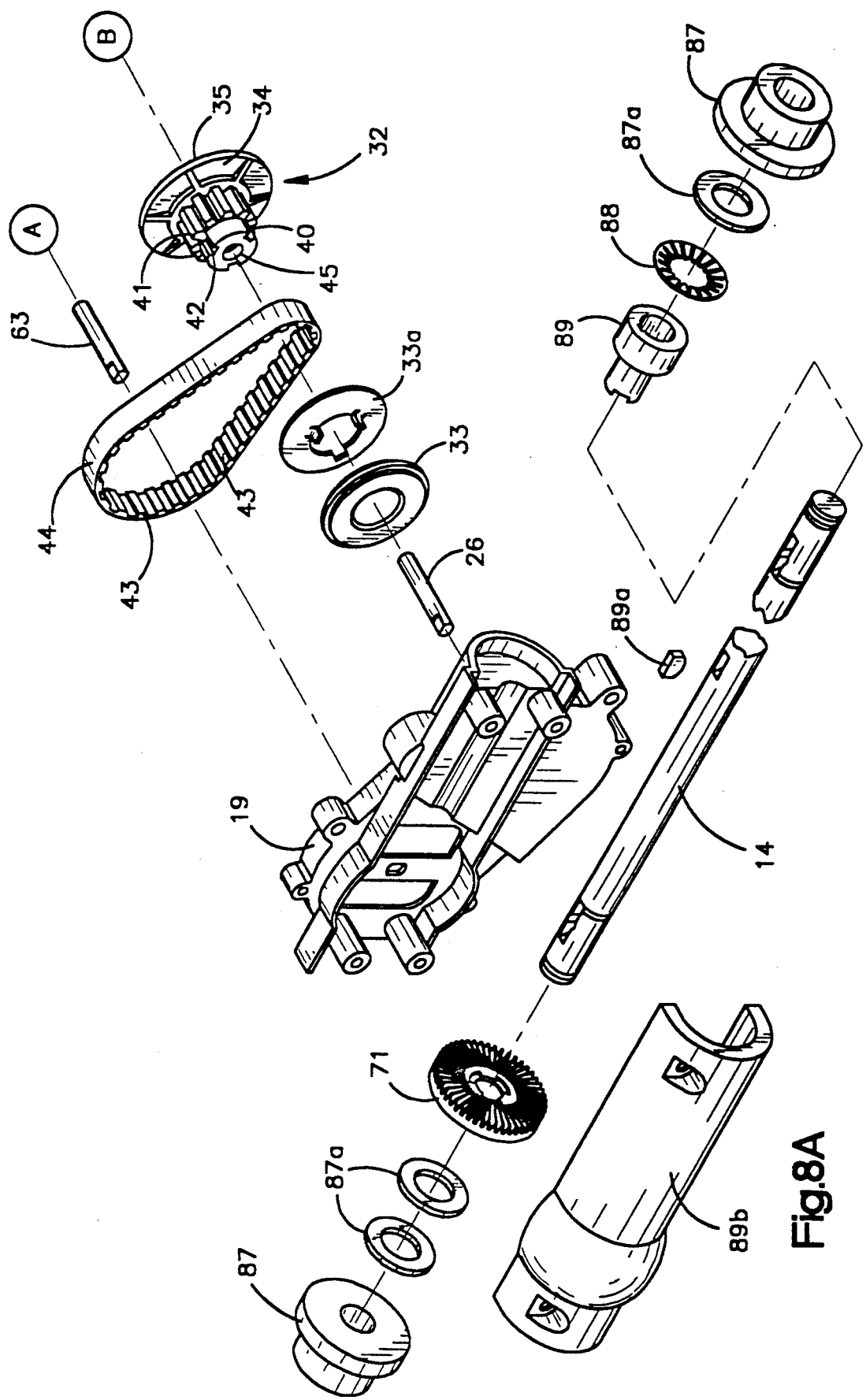

At a mid-section 40 of the clutch/sprocket member 32 are uniformly spaced, axially extending teeth 41 which define grooves 42 (best seen in FIGS. 5B and 8A). The grooves 42 cooperate with teeth 43 of a flexible drive belt 44.

Figure 8B:
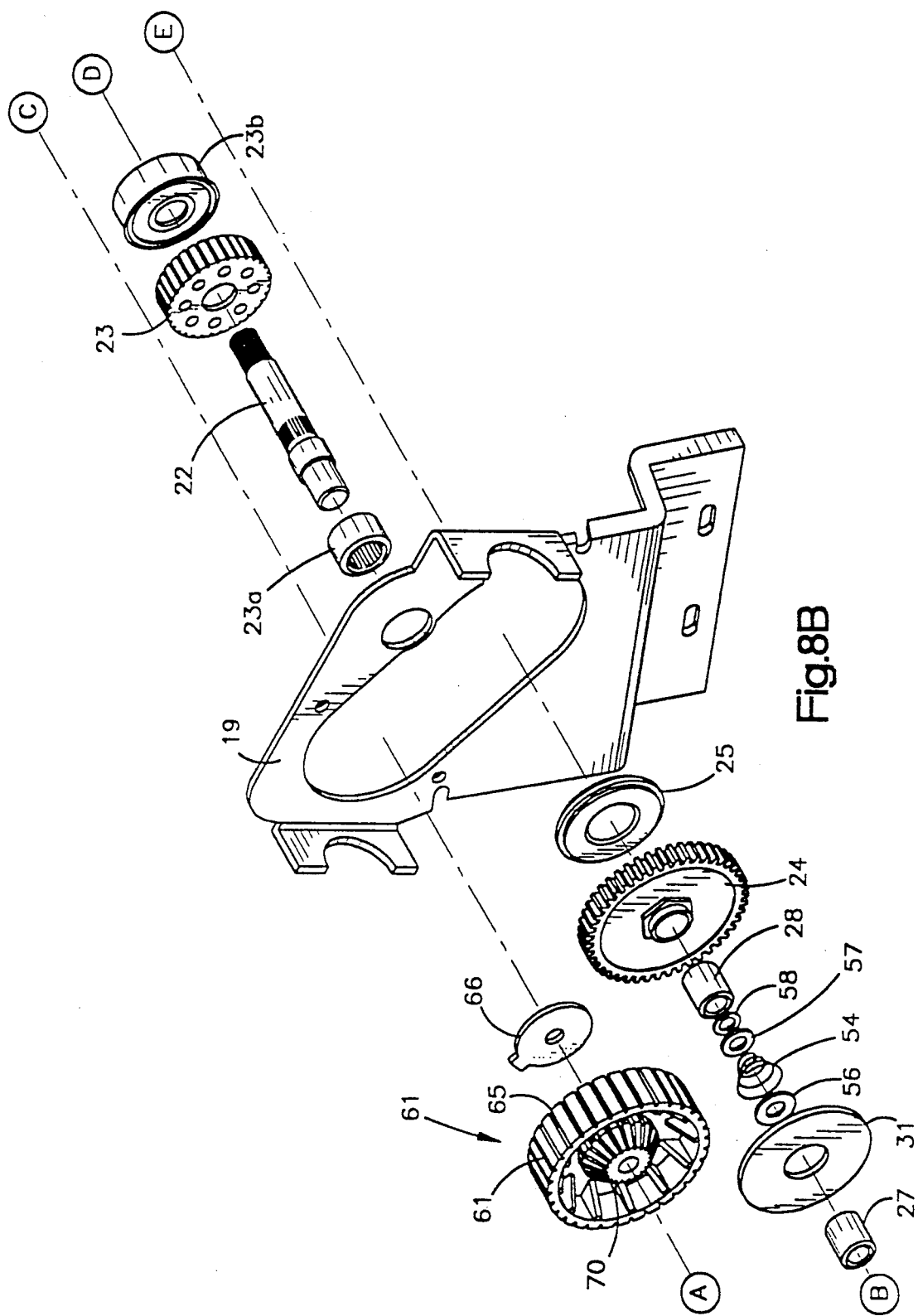
Figure 8C:
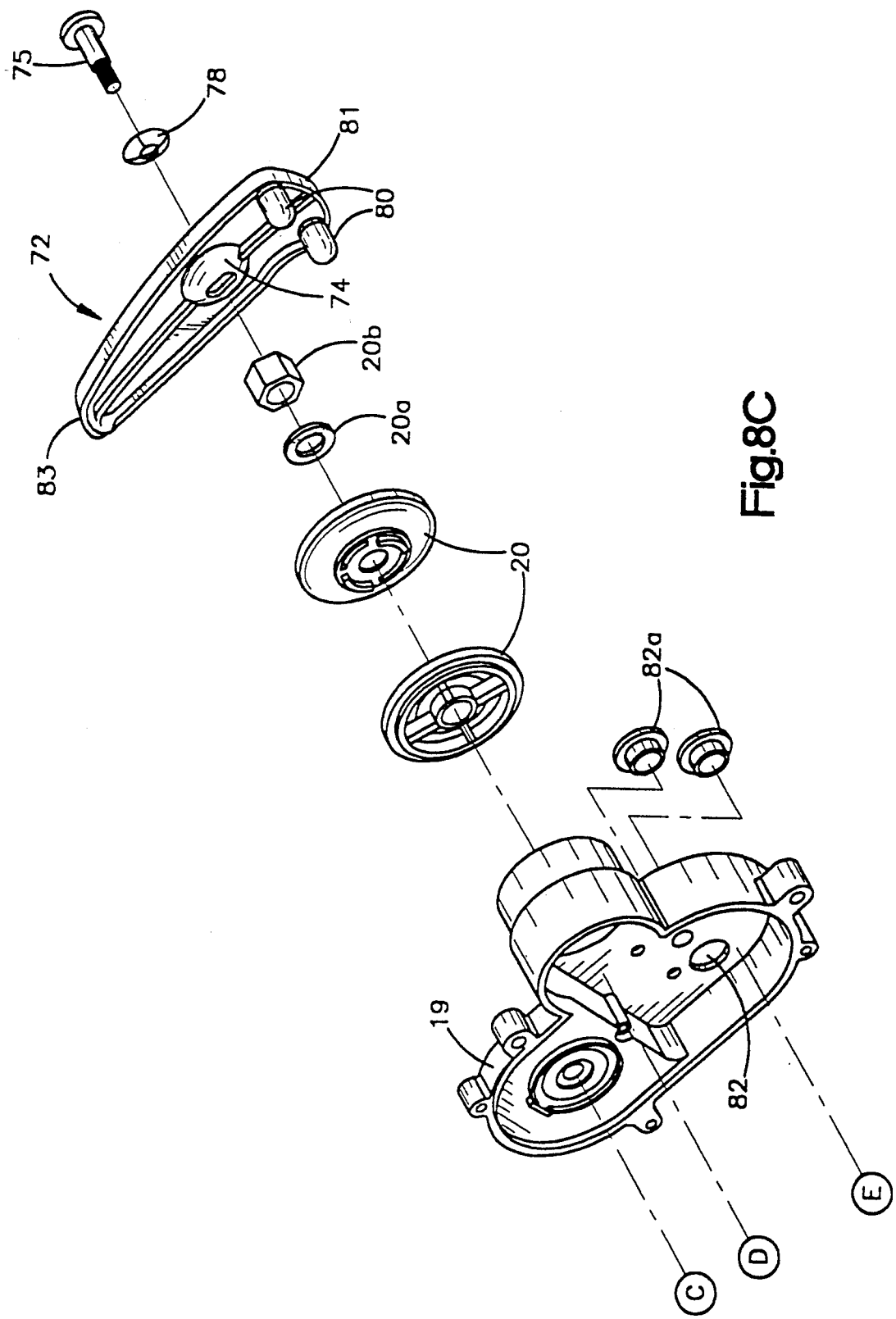

Turning to FIGS. 5A, 8A and 8B, the clutch/sprocket member 32 has an axial bore 45 which is stepped in diameter to provide successive counterbores 50, 51 and a clearance bore 52 for the shaft 26. The counterbore 51 is proportioned to receive the anti-friction bearing 27. The bearing 27 is in the same axial zone as the mid-section 40 of clutch/sprocket member 32. The counterbore 50 is proportioned to receive a biasing compression spring 54.

One end of the spring 54 bears against a radial surface 55 located between the counterbores 50 and 51 while the other end of the spring 54 bears against a race of the cylindrical bearing assembly 28. A washer 56 is located between the spring and radial surface. A wafer 57 and a washer 58 are located between the spring 54 and bearing assembly 28. The spring 54 is dimensioned to bias the friction facing material 31 away from the clutching surface 35.

Figure 2:
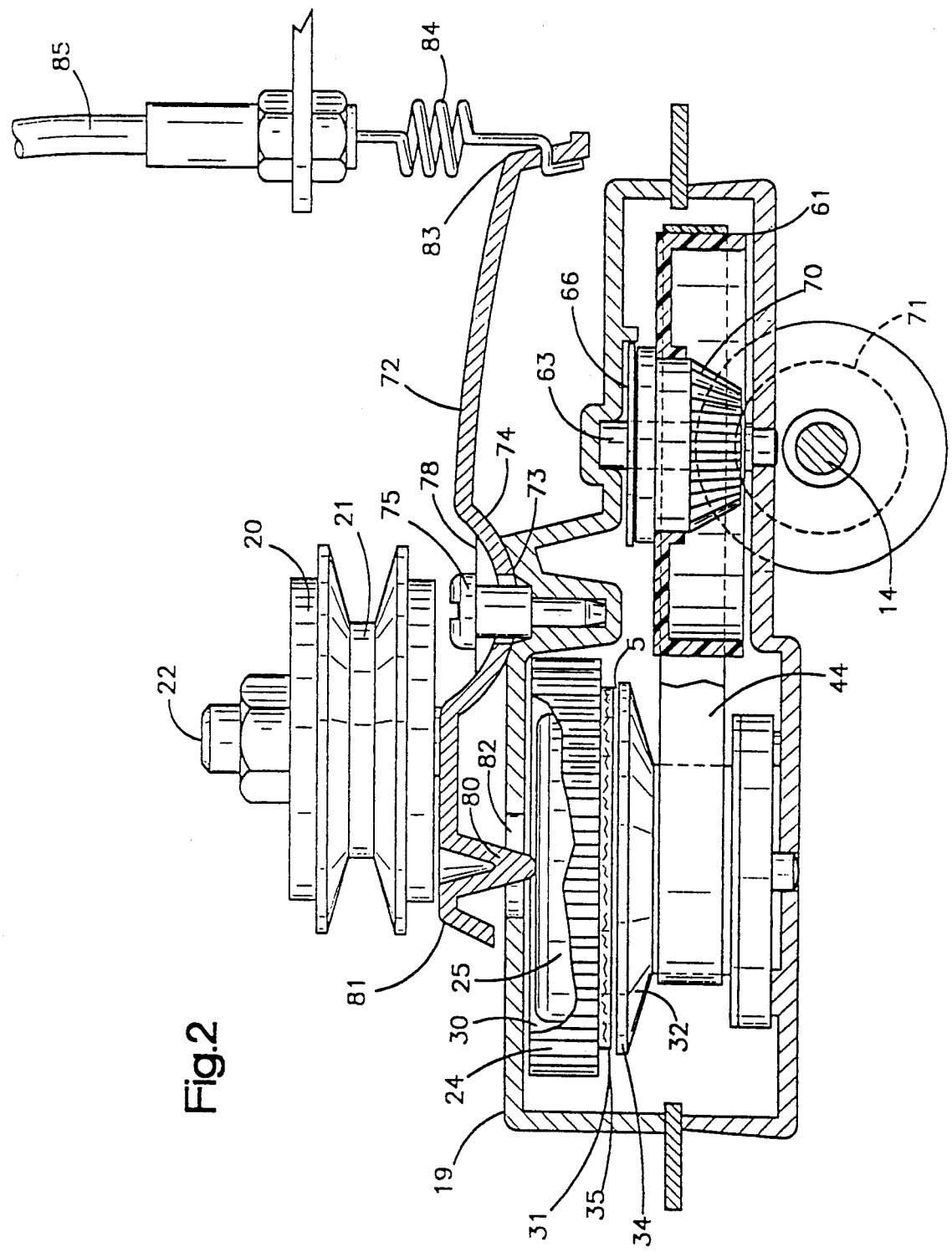
FIG. 2 is a partially sectioned view as seen from the plane indicated by the line 2—2 of FIG. 4 showing the friction clutch disengaged.
Figure 3:
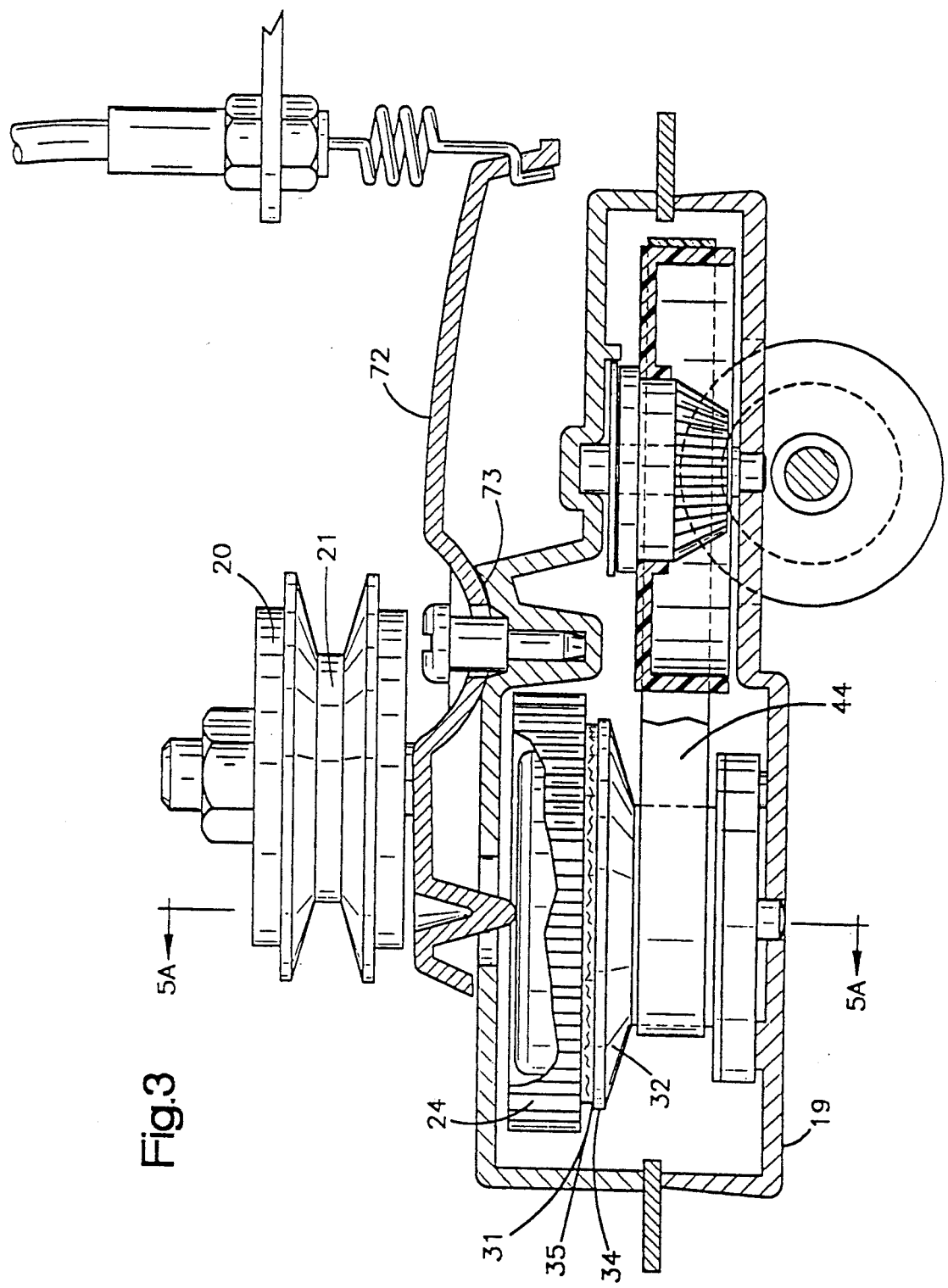
FIG. 3 is a view similar to FIG. 2 showing the clutch engaged.
Figure 4:
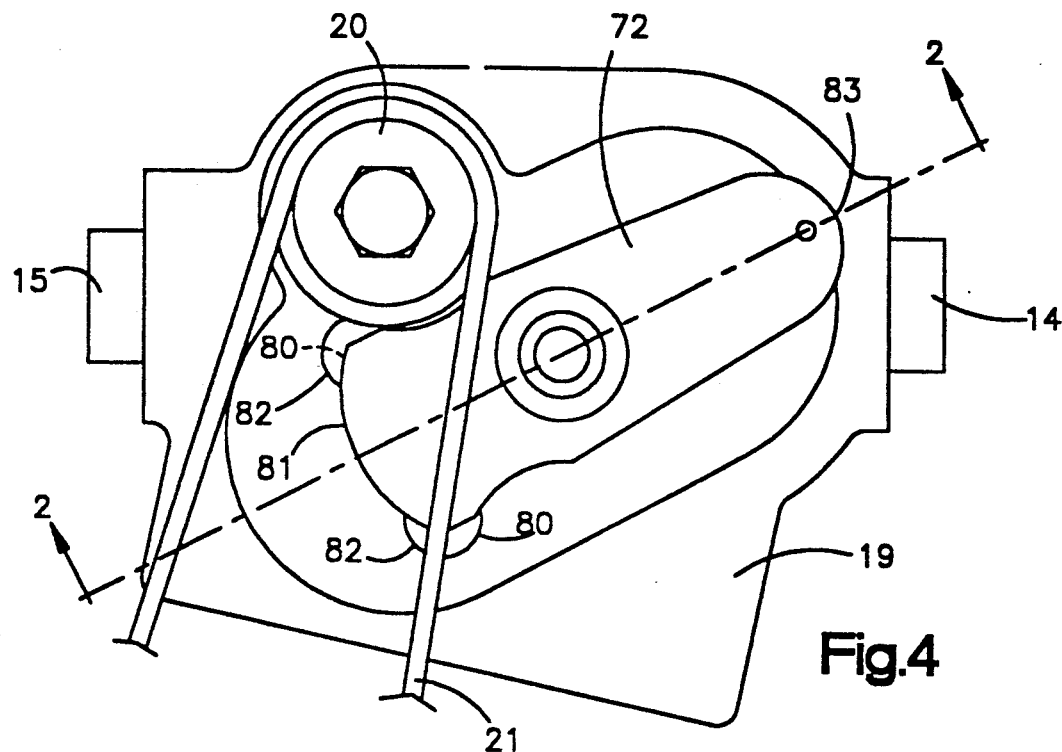
FIG. 4 is a plan view of a lawn mower drive transmission embodying this invention.

As best seen in FIGS. 2 and 3, a sprocket/gear member 61 is journaled on a shaft 63. This sprocket/gear member 61 has axially extending teeth 64 that define grooves 65. The grooves 65 cooperate with the teeth 43 of the belt 44. A washer 66 is interposed between the sprocket/gear member 61 and the casing 19. Sprocket/gear member 61 has a beveled gear part 70 which is centrally located around an axis of the sprocket/gear member 61.

A beveled gear 71 is in constant mesh with the beveled gear part 70 and is carried for rotation on the drive shaft 14. The axis of the drive shaft 14 is transverse to the axes of the previously described sprockets and gears of the drive transmission 15.

An actuator lever 72 is mounted in a spherical socket 73 integrally formed on a back wall of the casing 19. The lever 72 has a complimentary spherical boss 74 which fits into the socket 73 to form a ball joint. A screw 75 extends through the axes of the socket 73 and the boss 74 and retains the actuator lever 72. The screw 75 retains the lever 72 with adequate clearance to allow limited generally pivotal but if required for alignment spherical, movement of the actuator lever 72 on the casing 19. A spacer 78 is used to guide movement of the lever 72 via the ball joint. The actuator lever 72 has projections 80 located at opposite corners of an end 81 of the actuator lever 72. The projections 80 project through associated holes 82 in the rear wall of the casing 19 and contact the stationary race of the thrust bearing assembly 25 at diametrically opposed points equa-distant from the race's center. Seals 82a are placed within the holes 82 and around projections 80.

At an end 83 opposite from the end 81, the lever 72 is connected to a transmission surge suppression spring 84. The spring 84 is connected to a control cable 85 which is connected to a drive engagement lever of a lawn mower handle 90 via a second surge suppression spring 86.

The linkage of the actuator lever 72 provides a mechanical advantage of approximately 4:1, i.e. two pounds of applied force results in approximately eight pounds of force at the clutch/sprocket member 32.

Turning to FIG. 8A, the drive shaft 14 has bushings 87 located at opposite ends to mount the wheels 13a, 13b to the shaft. Washers 87a are located at each end of the drive shaft adjacent to the bushings 87. A spring disc 88 is located at one end of the drive shaft 14 adjacent a washer 87a. A driver 89 is connected to the bevel gear 71 and is locked to the drive shaft 14 by key 89a. The driver 89 thereby drives the drive shaft 14 during operation of the transmission and thereby drives wheels 13a, 13b. A cover 89b is attached to the casing 19 and covers the bevel gear 71 and a portion of the drive shaft 14.

When an operator of the lawn mower 10 exerts forces on the handle 90 during operation of the lawn mower, these forces are transmitted through the cable to the actuator lever 72 which activates the drive transmission 16 via the projections 80. The force transmitted by the projections 80 to the stationary race of the thrust bearing assembly 25 causes the intermediate gear 24 to compress against the spring 54 and thereby causes the friction facing material 31 to contact the clutching surface 35 as illustrated in FIG. 3. Because during operation of the lawn mower the intermediate gear 24 is constantly rotating, the contact between the friction facing material 31 and the clutching surface 35 causes the clutch/sprocket member 32 to begin rotating. The rotation of the clutch/sprocket member 32 in turn rotates the drive belt 44 which in turn rotates the sprocket/gear member 61. The beveled gear part 70 thereby rotates the beveled gear 71 thereby driving the drive shaft 14 and rear wheels 13a, 13b which causes the lawn mower to move forward.

The speed at which the lawn mower moves forward is controlled by the amount of force applied by the operator. The greater the force applied by the operator, the greater the force applied by the actuator lever 72 and the greater the contact pressure between the friction facing material 31 and the clutching surface 35. The increased pressure reduces the amount of slip between the friction facing material 31 and clutching surface 35 and therefore causes the clutch/sprocket member 32 to rotate at a rate close to or equal to the rate at which the intermediate gear 24 rotates. With a lower amount of force applied by the operator to the handle 90, the contact pressure between the friction facing material 31 and clutching surface 35 is reduced. When this reduced pressure is applied, the clutch/sprocket member 32 will slip at a greater level relative to the intermediate gear 24 and will therefore rotate at a lower rate than the intermediate gear 24 thereby causing the lawn mower to move forward at a slower speed.

The surge suppression springs 84 and 86 minimize variations in operator applied clutch control forces induced by mower traverse of irregular terrain. Because the handle 90 is fixed relative to the lawn mower 10, any bumps, such as a rock or a rut, which the lawn mower might encounter during operation could cause the lawn mower to lean or "rock" to a particular side. This type of lawn mower motion can cause the operator to react by applying forces to the handle 90 thereby causing a surge in the force applied to the transmission. The surge suppression springs 84 and 86 help modulate such forces. The lawn mower 10 will be able to traverse bumpy terrain and the springs will help absorb forces caused by any bumps rather than allowing such forces to be imparted to the actuator lever 72 and thereby to the drive transmission 15.

Turning to FIGS. 6A-7C, three embodiments of the handle 90 are illustrated. In FIGS. 6A-6D, the handle 90 comprises a handle body 91, a blade actuator lever 92, a top portion 93 and a drive engagement lever 94. When the operator desires to cut grass with the lawn mower 10, the operator pulls the blade actuator lever 92 toward the top portion 93. This begins rotation of a lawn mower blade (not shown). In order to begin movement of the lawn mower across the lawn, the drive engagement lever 94 is pushed towards the top portion 93. The lever 94 can generally be moved with the operator's thumb. This allows the speed of the mower to be easily and safely controlled by the operator without removing a hand from the handle. The drive engagement lever is connected to the control cable 85. The spring 86 biases the lever 94 to a disengaged position. The amount of force applied by the operator, and thereby the amount of movement of the drive engagement lever 94 towards the top portion 93 controls the amount of pressure applied by the actuator lever 72 to the drive transmission 15. This controls the speed at which the lawn mower 10 traverses a lawn.

Figure 7A:
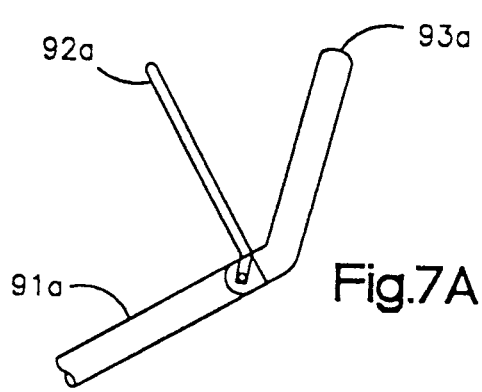
FIGS. 7A–7C are side elevational views of a second embodiment of the handle illustrating the lever in engagement and the gripping portion pivoted; and, FIGS. 8A–8C form an exploded view of the lawn mower drive system by matching corresponding letters of each Figure.
Figure 6B:
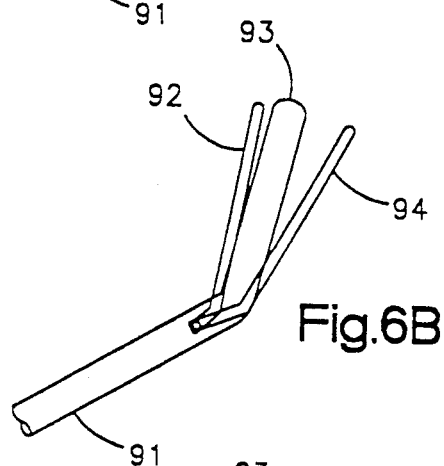
Figure 7B:
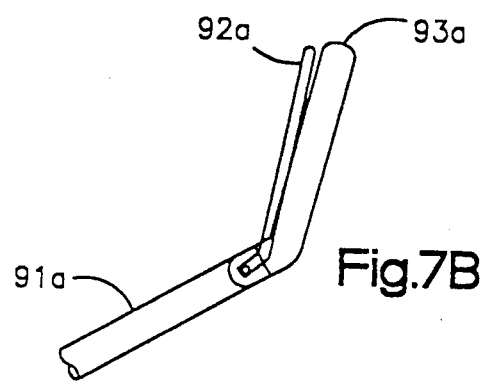
Figure 6C:
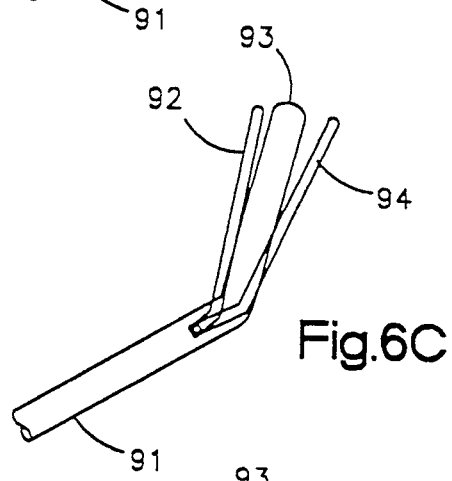
Figure 7C:
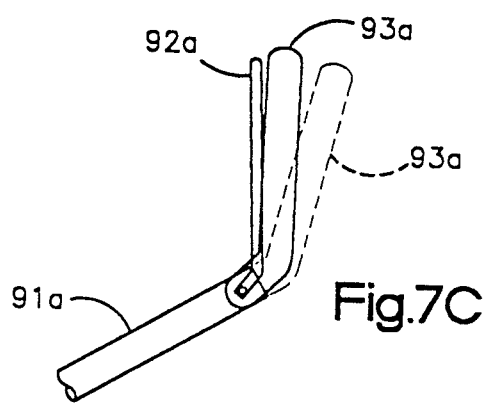
Figure 6D:
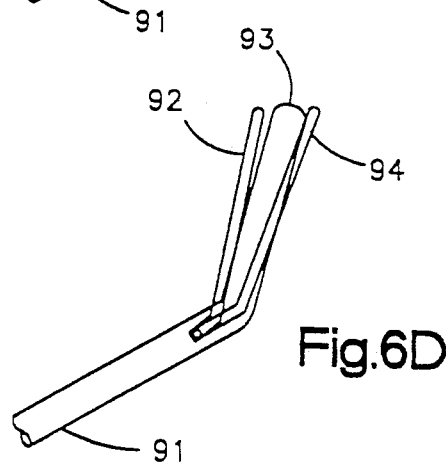

Turning to FIGS. 7A-7C, a second embodiment of the handle 90 is illustrated. In this embodiment, the handle comprises a handle body 91a, a blade actuator lever 92a and a top portion 93a. During operation, the blade actuator lever 92a is pulled towards the top portion 93a in order to actuate the lawn mower blade. The top portion 93a is connected to the control cable 85 and is capable of pivoting as illustrated in FIG. 7C. The spring 86 biases the top portion 93a to a disengaged position. The operator therefore merely pivots the top portion 93a of the handle 90 in order to activate the drive transmission 15. The amount of force applied to the top portion 93a determines the amount of pivot of the top portion and thereby controls the amount of force applied by the actuator lever 72 to the drive transmission 15 thereby controlling the speed at which the lawn mower traverses the lawn.

A third embodiment of the handle 90 is a combination of the first two embodiments and is designed like the handle illustrated in FIGS. 6A-6D. In this embodiment, the top portion 93 is capable of pivoting forward. During operation, the operator pulls the blade actuator lever 92 towards the top portion 93, and pushes the drive engagement lever 94 towards the top portion 93. This begins rotation of the lawn mower blade and initiates operation of the drive transmission. The pivoting of the top portion 93 allows the drive transmission to propel the lawn mower at varying speeds. The spring 86 biases the lever 94 to a disengaged position. The advantage of this embodiment is that the lawn mower may be operated with or without use of the drive transmission. If it is not desired to use the drive transmission, the operator merely pivots the top portion 93 of the handle without pivoting the drive engagement lever 94.

While the preferred embodiment of the invention have been illustrated and described in detail, the present invention is not to be considered limited to the precise construction disclosed. Various adaptations, modifications and uses of the invention may occur to those skilled in the art to which the invention relates and the intention is to cover hereby all such adaptations, modifications and uses which fall within the spirit or scope of the appended claims.

We claim:

1. In a power driven walk-behind-type mower having an engine, at least one driven wheel and handle structure for steering the mower, the improvement comprising an operator controlled drive train comprising:
   a. a driven member coupled to the engine for constant rotation about a driven axis when the lawn mower is in use;
   b. an output element axially aligned with the driven member for selective rotation about the driven axis;
   c. a movable clutch operatively interposed between the driven member and the output element for selectively establishing a drive connection there between;
   d. a lever operatively connected to the clutch;
   e. the handle structure including a gripping and control portion for steering the mower whereby the speed and direction of the mower can be controlled by the operator without removing a hand from said gripping and control portion;
   f. an interconnection interposed between said gripping and control portion and the lever for transmitting operator applied speed control forces to the lever and thence to the clutch; and,
   g. said interconnection including a surge suppression means for modulating forces applied to the clutch.

2. The lawn mower of claim 1 wherein a biasing means is operatively connected to the lever for biasing the lever toward a neutral clutch disengaged position.

3. A walk-behind, self-propelled, variable speed lawn mower comprising:
   a. a frame structure;
   b. an engine mounted on said structure;
   c. wheels supporting said structure for movement along a ground surface;
   d. a drive shaft, at least one of said wheels being mounted near an end of the drive shaft;
   e. a drive system operatively connected to said engine and said drive shaft comprising:
      i. gearing operatively connected to said engine and said shaft for transmitting forces from said engine to said shaft;
      ii. clutching means including a frictional coupling coactable with an element of said gearing selectively to provide force transmission to the shaft; and,
      iii. actuator means controllably connected to said clutching means and responsive to operator applied forces for controlling the speed at which said lawn mower traverses along such ground surface and to vary the speed proportionally to operator applied forces applied in the direction of mower movement; and,
   f. a handle movably connected to said frame and operatively connected to said actuator means, said handle being adapted to move in response to said operator applied forces whereby the speed and direction of the mower are controlled by the operator without his being required to move one of his hands.

4. The lawn mower of claim 3 wherein said handle is connected to said actuator means via a linkage including a spring for minimizing variations in the force applied to said actuator means due to variations caused by said ground surface.

5. The lawn mower of claim 4 wherein said actuator means comprises an actuator lever having a pair of projections which selectively engage said clutching means, said projections having axes paralleling an axis of rotation of an input gear forming a part of the gearing.

6. The lawn mower of claim 3 wherein the operative connection of the handle to the actuator means includes a surge suppression means for modulating forces applied to said clutching means.

7. A power-driven, walk-behind, operator controllable lawn mower comprising:
   a. a housing and frame structure;
   b. an engine mounted on said structure;
   c. a handle connected to said structure;
   d. wheels supporting said structure for movement along a ground surface, a spaced pair of said wheels being mounted near opposite ends of a drive shaft; and,
   e. a variable speed transmission having its control located on said handle and responsive proportionally to operator applied forces, said variable speed transmission comprising:
      i. an input gear operatively connected to said engine;
      ii. an intermediate gear meshed with said input gear and rotatable about an axis to provide continuous rotation during operation of said engine;

iii. a sprocket axially aligned associated with said intermediate gear;
iv. flexible power transmission means trained around said sprocket and a driven element, said driven element being operatively connected to said drive shaft to rotate said drive shaft about an axis;
v. clutching means including a frictional coupling coactable with said sprocket; and,
vi. actuator means including a biasing means biasing an actuator toward a clutching means disengaged position, the actuator means being connected to handle and responsive to operator applied forces overcoming the action of the biasing means to cause said clutching means compresses said sprocket and said intermediate gear together thereby causing said sprocket to rotate and create output which drives said driven element via said flexible power transmission means.

8. The lawn mower of claim 7 wherein said actuator means comprises a lever spherically mounted for rocking movement generally about an axis perpendicular to and offset from said drive shaft axis.

9. The lawn mower of claim 8 wherein said actuator means further comprises a spring biased connection to minimize speed variations induced by an irregular ground surface contour.

10. The lawn mower of claim 7 wherein the actuator means includes a surge suppression means for modulating forces applied to the clutching means.

11. In a power driven walk-behind-type mower having an engine and at least one driven wheel and an upstanding steering handle structure, an improved operator controlled drive train comprising:
a. a drive member drivingly connected to the engine for constant rotation about a drive axis when the lawn mower is in use;
b. an output element axially aligned with the drive member for selective rotation about the drive axis;
c. a clutch operatively interposed between the member and the element having a neutral position and being for selectively establishing a driving connection between the member and the element;
d. a lever operatively connected to the clutch, biasing means operatively connected to the lever for biasing the lever toward the neutral position;
e. the handle structure including a gripping portion for gripping by an operator to effect steering control of the mower;
f. a speed control member movably mounted on the handle structure and positioned near the gripping portion for operation by an operator concurrent with steering control; and,
g. a linkage interposed between the control member and the lever for transmitting operator speed control forces from the speed control member to the lever and thence to the clutch in opposition to such biasing means.

12. The mower of claim 11 wherein the linkage includes a biased connection for minimizing variations in clutch control forces indeed by mower traverse of irregular terrain.

13. The lawn mower of claim 11 wherein the linkage includes a surge suppression means for modulating forces applied to the clutch.

14. A walk-behind, self-propelled lawn mower comprising:
a. a frame structure;
b. an engine mounted on said structure;
c. wheels supporting said structure for movement along a ground surface, a pair of said wheels being mounted on opposite ends of a drive shaft, at least one wheel of the pair being drivingly connected to the shaft;
d. a variable speed drive system responsive to operator applied forces comprising:
i. an input pinion operatively connected to said engine;
ii. an intermediate gear meshed with said pinion for continuous rotation during use;
iii. a sprocket axially aligned and associated with said intermediate gear;
iv. clutching means including a frictional coupling coactable with said sprocket;
v. flexible power transmission means trained around said sprocket and a driven element, said driven element being operatively connected to said shaft; and,
vi. actuator means connected to said clutching means and responsive to said operator applied forces to cause the clutching means to coact with the sprocket in driving relationship, the actuator means including a biasing means for blasing the actuator means toward a neutral position wherein the clutch means is not in driving relationship with the sprocket; and,
e. a handle pivotally connected to said frame and operatively connected to said actuator means, said handle being adapted to pivot in response to said operator applied forces.

15. The lawn mower of claim 14 wherein said actuator means comprises an actuator lever having a pair of projections which selectively engage said clutching means, said projections having axes generally paralleling an axis of rotation of said input gear.

16. The lawn mower of claim 14 wherein said actuator means includes a spherically mounted lever.

17. The lawn mower of claim 14 wherein the operative connection of the handle to the actuator includes a surge suppression means for modulating forces applied to said clutching means.

18. A walk-behind, self-propelled lawn mower comprising:
a. a frame structure;
b. an engine mounted on said structure;
c. wheels supporting said structure for movement along a ground surface, at least one of said wheels being mounted on a drive shaft;
d. a variable speed drive system responsive to operator applied forces comprising:
i. a drive member drivingly connected to said engine for constant rotation about a drive axis when said lawn mower is in use;
ii. an output element axially aligned with said drive member for selective rotation about said drive axis;
iii. clutching means including a frictional coupling coactable with said output element;
iv. a pivotally mounted lever operatively connected to said clutching means; and,
v. a driven element operatively connected to said output element and said drive shaft to rotate said drive shaft;
e. a handle pivotally connected to said frame and operatively connected to said lever, said handle being adapted to pivot in response to said operator applied forces; and,
f. the operative connections of the handle to the lever including a surge suppression means for modulating forces applied to the clutching means.

* * * * *